Sept. 1, 1925.

A. B. LARSON

BUMPER

Filed May 9, 1925

1,551,755

INVENTOR:
Alison B. Larson
BY David E. Carlsen
ATTORNEY.

Patented Sept. 1, 1925.

1,551,755

UNITED STATES PATENT OFFICE.

ALISON B. LARSON, OF ST. PAUL, MINNESOTA.

BUMPER.

Application filed May 9, 1925. Serial No. 29,071.

*To all whom it may concern:*

Be it known that I, ALISON B. LARSON, a citizen of the United States, residing at St. Paul, in the county of Ramsey and State of Minnesota, have invented certain new and useful Improvements in Bumpers, of which the following is a specification.

My invention relates to bumpers for vehicles and the main object is to provide a simple and efficient device particularly adapted for use on automobile trucks. Another object is to provide a bumper of such construction that its impact bar may be readily swung away from its normal transverse position so that the operator may have free access to the starting crank of the engine.

Figure 1:
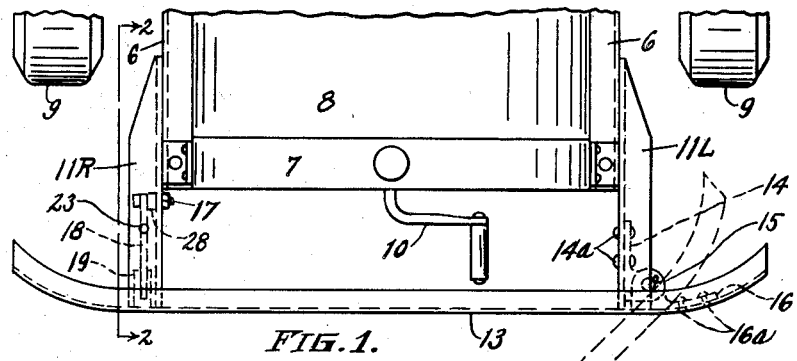
Fig. 1 is a top view of my improved bumper in operative position on the front end of a motor truck.

Referring to the drawing by reference numerals, I have illustrated my device as being attached to the forward ends of the main frame members 6 of an auto truck of which are shown further only the radiator 7, hood 8, the forward parts of the front or steering wheels 9 and 10 is the engine starting crank, all of the said parts in approximately correct relative locations.

It is well known in the automotive field that bumpers are very necessary on large auto trucks but as the engines in most such trucks must be cranked by hand it is difficult to provide a satisfactory bumper which permits free access to the starting crank. My improved bumper is constructed so as to be normally in rigid transverse relation to the front end of the truck and is readily swung to one side when so desired.

My device comprises two forwardly extending members $11^R$ and $11^L$ preferably of heavy angle iron and fixed one on each main frame member 6 as at 12 and extending forward a predetermined distance. The front ends of these members 11 are adapted to rigidly support horizontally and transversely of the truck the main bumper bar 13 sometimes known as the impact bar.

In the forward end of one member as $11^L$ (Fig. 1) I secure as at $14^a$ a substantial hinge member 14 with a removable vertical hinge pin 15 passed through it and another hinge member 16 secured as at $16^a$ in the bumper bar 13. The latter bar may thus be swung horizontally, as to position $13^x$ (Fig. 1) permitting free access to the starting crank 10. The bumper bar is held rigidly and detachably fixed in the transverse position shown in full lines in Fig. 1 by a special locking mechanism illustrated as mounted on the right hand frame member $11^R$. It will be understood that the frame members 11 have each a deep vertical flange or web $11^W$ which is secured to the vehicle frame at 12. On said web $11^W$ I fulcrum on a special bolt 17 a longitudinally arranged locking bar 18 preferably made of bar steel and extending forward parallel to web $11^W$ almost to the forward end of the member 11. The front end of said lock bar is made in the form of a hook $18^a$ directed downwardly and rearwardly and from thence the under edge of the bar is sloped upwardly as $18^b$. The bumper bar is preferably a heavy channel iron and carries a rearwardly directed T-iron 19 fixed on its web as at 20 with its leg projecting rearwardly and in said leg is a slot 21. Thus when the bumper bar is in closed position (Figs. 1 and 2) the hook part $18^a$ of the lock bar will engage in the slotted part 21 of the T-iron 19 and hold the bumper bar, the said leg of the T-iron engaging the slanting face $18^b$ of the lock bar and forcing it to rise until the tooth $18^a$ drops into the slot 21 as the bumper is closed. The lock bar is held from dropping too far by any suitable hanger such as the angle iron bracket 22 secured at 23 to the horizontal web of the frame member 11 and intermediate the ends of bar 18 and having a properly spaced vertical slot $22^a$ (Fig. 3) in which the lock bar is oscillable but limited as to downward movement.

Figure 2:
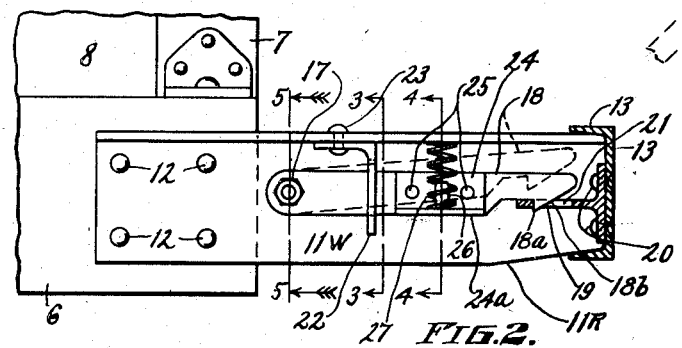
Fig. 2 is an enlarged sectional elevation on line 2—2 in Fig. 1 showing the holding means for the impact bar and the adjacent front corner of the auto truck.
Figure 3:
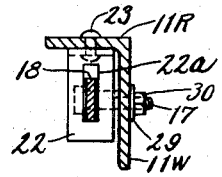
Fig. 3 is a sectional detail view as on line 3—3 in Fig. 2.
Figure 4:
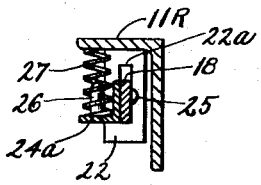
Fig. 4 is a sectional detail as on line 4—4 in Fig. 2.

24 is a bracket secured at 25 on bar 18 between the hanger 22 and the tooth $18^a$ and comprises preferably an angle iron with its horizontal arm $24^a$ projecting outwardly and carrying a vertically directed fixed stud 26 normally within a helical coil spring 27 under compression between arm 24ª and the under side of the horizontal web of the frame member 11 (see Fig. 2). Thus the locking bar is always held down in locked position by the spring but the latter will yield upwardly when the bumper bar is swung into locked position and the locking bar is thereby tilted upwardly. To release the locking bar the operator may simply put the palm of one hand on the top arm of member 11 and place the fingers of the same hand under web 24ª of bracket 24 and with a squeezing action of the hand cause the lock bar 18 to tilt upwardly, as to the dotted line position in Fig. 2, thereby releasing the tooth 18ª from locking contact with the slotted part 21 of the bumper member 19 and the bumper is then free to be swung outwardly.

Figure 5:
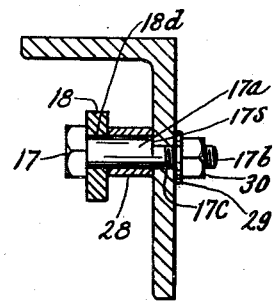
Fig. 5 is an enlarged sectional detail view as on line 5—5 in Fig. 2 and revealing the eccentric take-up feature for the locking bar of my device.

The fulcrum bolt 17 is an eccentric bolt, its heaviest shank part 17ª being next to its head and extending through a properly sized bore 18ᵈ in the lock bar and thence through a spacing collar 28 (see Fig. 5). 17ᵇ is a reduced continuation of the bolt shank but is offset forming a shoulder 17ˢ normally directed upwardly and said shank 17ᵇ is threaded and projects through an aperture 17ᶜ in the vertical web 11ʷ. Its protruding end carries a washer 29 and nut 30 for tightening the eccentric bolt in any desired position. It is obvious that by adjusting this bolt 17 the fulcrum of the locking bar 18 is movable horizontally and thus any wear and tear on the tooth 18ª is taken up and the bumper bar 13 is held securely in non-rattling position and tight against the front end of the frame member 11.

The operation of my device and its use have been fully disclosed. It is of course optional to use impact bars of various kinds and shapes of materials.

What I claim is:

1. In a bumper of the class described, a pair of parallel, horizontal arms adapted to be fixed longitudinally on a vehicle frame and protruding from the end thereof, an impact bar pivotally secured on the outer end of one of said arms and normally in transverse spaced relation to the adjacent end of the vehicle, means for detachably securing said impact bar to the outer end of the adjacent arm and comprising a vertically oscillable locking element on the latter arm and a fixed horizontal tongue member on the impact bar adapted to be swung into automatic locking engagement with said locking element when the impact bar is swung to closed position.

2. The structure specified in claim 1, in which said locking element on the arm comprises a bar arranged longitudinally of the arm and pivotally mounted at its rear end on a pivot adjustable longitudinally of the arm, said bar having its forwardly directed end formed with a downwardly and rearwardly directed hook and a forwardly and upwardly directed angular face from said hook, said fixed tongue on the impact bar having a slotted portion adapted to engage said sloping face and be engaged by the hook of the lock bar, and a spring element adapted to impel the locking bar in a downward direction.

3. The structure specified in claim 1, in which said locking element on the arm comprises a bar arranged longitudinally of the arm and pivotally mounted at its rear end on a pivot adjustable longitudinally of the arm, said bar having its forwardly directed end formed with a downwardly and rearwardly directed hook and a forwardly and upwardly directed face from said hook, said fixed tongue on the impact bar having a slotted part adapted to engage said sloping face and be engaged by the hook of the lock bar, and a spring element adapted to impel the lock bar downwardly, said adjustable pivot of the lock bar comprising a cam member, the cam portion of which is pivotally engaged in the rear end of the lock bar and the end of the cam portion engaging the face of the adjacent arm, an offset threaded extension of said cam adapted to be inserted in an aperture in said arm and means engaging said threaded part and the arm to hold the cam in selective positions and the locking bar in corresponding adjusted positions longitudinally of the arm.

In testimony whereof I affix my signature.

ALISON B. LARSON.